United States Patent [19]

Misra et al.

[11] Patent Number: 5,141,734

[45] Date of Patent: Aug. 25, 1992

[54] STEAM PRODUCING PROCESS

[75] Inventors: Chanakya Misra, Pittsburgh, Pa.; Steven W. Sucech, Lake Villa, Ill.

[73] Assignee: Aluminum Company of America, Pittsburgh, Pa.

[21] Appl. No.: 514,292

[22] Filed: Apr. 24, 1990

Related U.S. Application Data

[63] Continuation-in-part of Ser. No. 729,542, May 2, 1985, abandoned, which is a continuation of Ser. No. 548,948, Nov. 7, 1983, abandoned.

[51] Int. Cl.$^5$ .................. C01B 5/00; C01F 7/44
[52] U.S. Cl. .................. 423/580; 204/67; 422/242; 423/111; 423/127; 423/625
[58] Field of Search ............... 423/111, 127, 625, 580

[56] References Cited

U.S. PATENT DOCUMENTS 4,224,288  9/1980  Potter .................. 423/123

FOREIGN PATENT DOCUMENTS 507723  11/1954  Canada .................. 423/625

OTHER PUBLICATIONS

Olseh, Unit Processes and Principles of Chemical Engineering, D. Van Abstrand Co., Inc., N.Y. (1932), pp. 1-3.

Primary Examiner—Wayne Langel
Attorney, Agent, or Firm—Daniel A. Sullivan, Jr.; Douglas P. Mueller

[57] ABSTRACT

In a process utilizing steam, the method of producing at least a portion of said steam, including heating a water-containing, solid substance for generating steam and capturing the generated steam for said process. A suitable solid substance is Al(OH)$_3$. New alumina products and uses therefor are obtained.

10 Claims, 4 Drawing Sheets

STEAM PRODUCING PROCESS

CROSS-REFERENCE TO RELATED APPLICATION

This application is a continuation-in-part application of U.S. Ser. No. 729,542, filed May 2, 1985, abandoned, which in turn is a continuation application of U.S. Ser. No. 548,948, filed Nov. 7, 1983, abandoned.

SUMMARY OF THE INVENTION

It is an object of the invention to provide a method of producing steam for steam-consuming processes.

This, as well as other objects which will become apparent in the discussion that follows, are achieved according to the present invention, by heating a water-containing, solid substance for generating steam.

The invention has particularly advantageous application in conjunction with water removal from aluminum hydroxide to prepare alumina particularly as feed for the Hall-Heroult electrolytic process for producing aluminum metal. The aluminum hydroxide, in a moist or dry condition, is heated in a decomposer under self-fluidizing conditions, or fluidized by steam, and without contact by exhaust gases from fuel combustion, so that pure steam is obtained. Pressures are typically in the 20 to 500 psia range, in order that the steam will be at pressure suitable for use. This steam is available for use as process steam in a Bayer refining plant and also for power generation in usual steam engines or turbines. New alumina products are obtained. An important advantage achieved is that there is less breakage of particles during water removal than is the case during the flash or kiln calcination, prior art techniques of water removal. An additional advantage is that an alumina product can be obtained which is characterized by a reduced amount of the parallel fissuring typifying alumina from atmospheric pressure, flash and kiln calcination of aluminum hydroxide. The alumina product of this invention is stronger than alumina produced in atmospheric-pressure calcination processes, as indicated by lower attrition indices. As an added benefit, differential calorimetry tests show the process using about 10% less energy as compared with flash or kiln calciners, this saving being in addition to the energy savings achieved by utilizing the steam coming from the aluminum hydroxide.

The production of essentially pure steam from aluminum hydroxide (alumina trihydrate, or "hydrate" for short) can be carried out using a variety of energy sources. Both direct and indirect heating methods are possible. The heating method most applicable for retrofit to an existing calciner is the use of hot combustion gases from the furnace section of the calciner to indirectly heat the hydrate. Other heating methods for indirect heat transfer include electrical resistance heating, hot oil or salt baths, heating by inductance, lasers, plasmas, combustion of coal, microwave radiation, nuclear and chemical reactors. The heat source may originate from another process, such as the use of hot gases from a coal gasification unit to decompose hydrate, or the hydrate may be indirectly decomposed while acting as a coolant to control a highly exothermic reactor.

In comparison with flash and kiln calcination processes, where combustion gases mix directly with the $Al(OH)_3$ being calcined, the mode of the invention utilizing indirect heating with combustion gases is particularly advantageous. For instance, in the case of the direct contact of the prior art, the volume and velocity of gases contacting the material undergoing calcination are much larger, this leading inherently to rougher handling and to fines generation. This greater volume of gases must be passed through correspondingly large cyclones and electrostatic precipitators for dust capture. In comparison, in the decomposer of the present invention, the combustion gases are not mixed with the solids. Therefore, the material undergoing calcination is only contacted by the smaller quantity of gas (steam) evolved from the material itself, and only this smaller quantity need be treated for dust extraction, if there be any need at all for dust extraction.

An additional advantage of this uncoupling of the combustion gases from the evolved gaseous water has to do with the result that the combustion gases used for heating the decomposer do not become loaded with the water being evolved from the $Al(OH)_3$. Thus, it is chemical engineering practice, for a number of reasons, to avoid condensation in exhaust gases. Whereas the dew point in the gases leaving the flash and kiln $Al(OH)_3$ calciners of the prior art will be around 180° F., the combustion gases used for indirect heating in the present invention will have the lower, 150° F. dew point usual for exhaust gases loaded only with water from combustion air and hydrocarbon burning.

Direct heat transfer methods for drying and decomposition of hydrate to form an alumina product and pure steam include the use of in-bed, electrical resistance heating, microwave generators, lasers and/or superheated steam.

BRIEF DESCRIPTION OF THE DRAWINGS

FIGS. 3 and 4 are scanning electron micrographs, at 12,000 times magnification; FIG. 3 being of a product of the invention and FIG. 4 being of a product of the prior art.

DESCRIPTION OF THE PREFERRED EMBODIMENTS

A. Continuous Process

The invention finds a preferred setting in conjunction with the Bayer process for producing alumina from bauxite. The Bayer process utilizes steam, for instance, in its digester, where bauxite ore previously crushed in a grinder is treated with sodium hydroxide solution to dissolve aluminum values. Steam provides the heat needed to maintain the temperature and pressure conditions of the slurry in the digester. These are typically in the 100° to 300° C. and 100 to 500 pounds per square inch absolute pressure (psia) ranges.

Steam is also used, e.g., in the evaporator of a Bayer plant.

Taking the digester as an example, the steam may heat the slurry directly by being injected right into the slurry - for instance, through a pipe opening below the slurry surface. Alternatively, the steam may heat the slurry indirectly by supplying heat to a heat exchanger in contact with the slurry.

In general, it is of advantage that the steam be completely $H_2O$, thus containing no diluting gases such as air. For instance, the steam should be at least 50 volume-% water, preferably at least 75 volume-% water, and more preferably at least 94, or even 100, volume-% water. One particular advantage of steam which is pure $H_2O$ is its characteristic of condensing at a constant temperature, such constant temperature being a function of pressure. This is of use for temperature control in the process consuming the steam. For instance, 110 psia pure-$H_2O$ steam condenses at about 175° C. and can be used to maintain a digester temperature of about 150° C., the 25° C. difference being provided for heat transfer driving force.

The chemical composition of steam produced according to the invention is comparable to steam produced in conventional steam generating systems.

If the steam is diluted with other gases, such as air, which is uncondensable at temperatures of interest for steam-consuming processes, the $H_2O$ in the steam condenses over a range of temperatures (as will be evident from the known variation of dew point with water vapor partial pressure). Additionally, the uncondensable gases represent a dilution of the great heat release obtained as $H_2O$ condenses, the heat released by the uncondensable gases as they drop in temperature being relatively insignificant.

A diluting gas such as $CO_2$, for instance resulting from combustion of a fuel containing carbon, is extremely disadvantageous in the case of direct steam heating in a Bayer process digester, because the $CO_2$ reacts with the NaOH needed to dissolve the aluminum values in the bauxite. The NaOH loss occurs by reaction of the type $$2NaOH + CO_2 \rightarrow Na_2CO_3 + H_2O$$

In the present invention it is proposed to carry out at least the initial part of the calcination of aluminum hydroxide (hydrate) by indirectly or directly heating the hydrate in a suitable, pressurized container vessel. This enables collection of steam released under pressure by the evaporation of the free moisture and removal of the chemically bound water. The separated steam can then be used in other areas of the alumina refining plant, resulting in considerable energy savings. The partly calcined alumina product obtained from the pressure decomposition vessel may then be calcined in conventional calcination equipment such as a rotary kiln or a stationary calciner.

Thus, according to one embodiment of the present invention, steam for the Bayer process is obtained by heating aluminum hydroxide, $Al(OH)_3$, to at least partially calcine it, with the evolved steam being captured for transmission, e.g., to the digester. This is unlike previous methods of calcining $Al(OH)_3$, where, rather than being steam, the gases coming from the calcining are fuel exhaust containing water from the burning of the fuel and from the $Al(OH)_3$, an example of an analysis being, in volume-%, 8% $CO_2$, 55.3% $N_2$, 2.5% $O_2$, and 34.2% $H_2O$, as taken from the table on page 34 of Schuhmann's *Metallurgical Engineering*, Volume 1, *Engineering Principles*, Addison Wesley Press Inc., Cambridge, Mass. (1952). In such processes, the burning, or burned, fuel-air mixture directly contacts the $Al(OH)_3$ as it is being dehydrated.

A particular advantage of $Al(OH)_3$ as a solid used as a source of steam is that the steam is essentially 100%, i.e. pure, $H_2O$. This is to be contrasted with, e.g., saw dust, where the steam might be contaminated with organic compounds also volatilizing during the liberation of the steam.

It is estimated that about one-third of the steam requirement for a Bayer process can be supplied from the water in the $Al(OH)_3$ product.

A principal equipment of the process is a decomposer vessel. Though the decomposition process may be carried out by any combination of a pressure vessel and indirect heating, an efficient method for carrying out this process is by the use of a fluidized bed. Our investigations have shown that a bed of the hydrate exhibits self-fluidizing behavior on heating due to steam release on decomposition. High rates of heat transfer to the decomposing hydrate can thus be attained by utilizing this self-fluidizing characteristic.

Figure 1A:
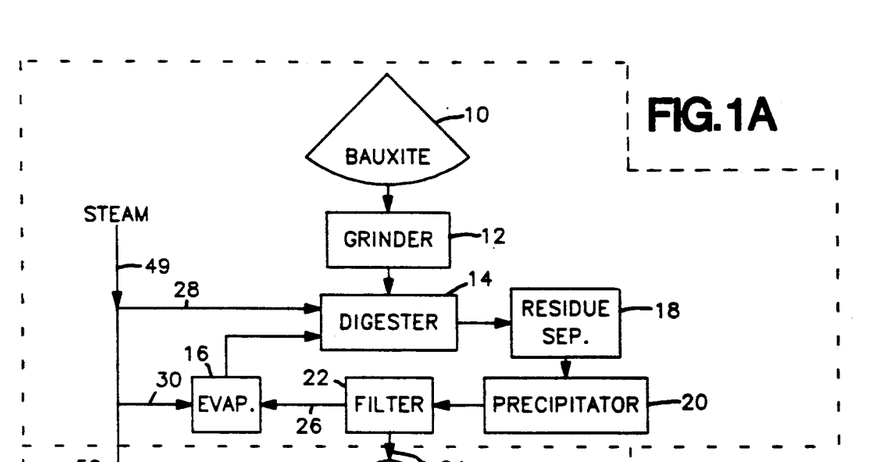
FIGS. 1A to 1C compose a process flow schematic of an embodiment of the invention.
Figure 1B:
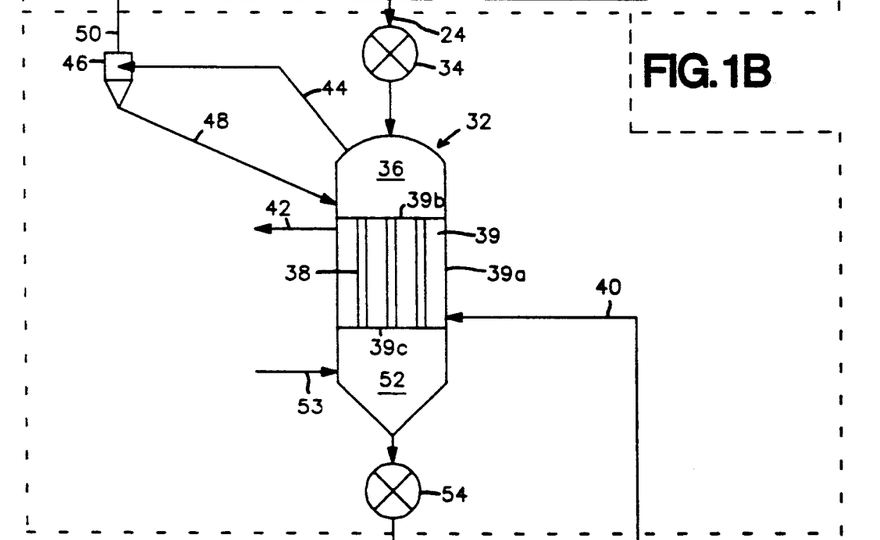
Figure 1C:
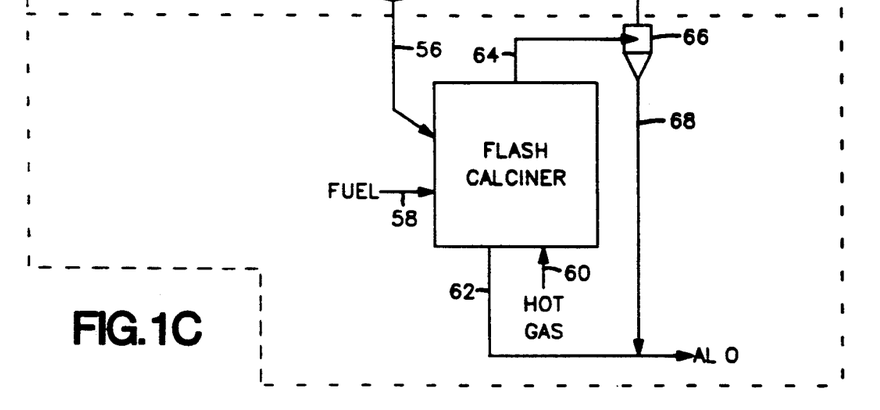

With reference now to FIG. 1, it illustrates an embodiment where the process of the invention is used in conjunction with a Bayer process. The segments of FIG. 1 show as follows:

FIG. 1A — A Bayer process utilizing steam from the process of the invention;

FIG. 1B — Generating steam according to the invention; and

FIG. 1C — A flash calciner for bringing partially calcined alumina from FIG. 1B to a final, desired water-content suitable for use as metallurgical alumina.

First with respect to FIG. 1A, bauxite from bauxite stockpile 10 is ground in grinder 12 and then sent to digester 14, where it contributes to the solids portion of the slurry in the digester. The liquid portion of the slurry is a suitably concentrated, for example by evaporator 16, NaOH-containing, aqueous solution.

Following digestion, the slurry is fed to residue separation equipment 18, which removes solids remaining from the digestion. Then, solution, free of solids, is fed to precipitator 20, where aluminum hydroxide, $Al(OH)_3$, crystalline form gibbsite, is precipitated. The resulting slurry is run through filter 22, to yield a solids portion through line 24 and a liquids portion through line 26 going to evaporator for concentration for recycle back to digester 14. The $Al(OH)_3$ filter cake solids in line 24 will have both free moisture, to the extent of 8-16 weight-%, and chemically bound water at 34.5 weight-% on dry $Al(OH)_3$.

Other steps may, of course, be in the Bayer process, for instance a causticization using lime. Thus, FIG. 1A is for the purpose of illustrating how the steam generating process of the invention may be combined with a Bayer process in general, as an example of a steam consuming process, rather than to go into the many fine points of a Bayer process.

According to the invention, steam is generated for supply to the digester and evaporator portions of the Bayer process through lines 28 and 30 by heating $Al(OH)_3$ in decomposer 32 (FIG. 1B) to drive off free moisture and chemically combined water from the $Al(OH)_3$. The equilibrium state of the removed water is the gaseous state. The decomposer is operated under pressure of suitable magnitude above one atmosphere (14.7 psi) gage pressure to give the temperature desired during condensation of the steam in the Bayer process. The pressure may, for instance, be in the range 20 to 250 psig (pounds per square inch gage pressure).

Feeder 34 is provided to transfer the $Al(OH)_3$ from essentially atmospheric pressure in line 24 to the elevated, e.g. 20 to 250 psig, pressure of the decomposer 32. Feeding equipment of the type described in pages 99 to 120 of the publication "Workshop on Critical Coal Conversion Equipment" for continuous feeding of coal from a low pressure state to a high pressure state may be used for feeder 34. For example, a suitable feeder would be the Lockheed Kinetic Extruder shown in Slide 6.22 on page 113 of that publication. Alternatively, the feeder could be a pair of lock hoppers, with one feeding under elevated pressure while the other is filling under atmospheric pressure, and vice versa, as illustrated by the Ducon Coal Feed System in Slide 6.26 on page 115. Further identifying information on this publication is as follows: Huntington, W. V. - Oct. 1–3, 1980, Harry W. Parker, Editor, The Engineering Societies Commission on Energy, Inc., 444 North Capitol Street, N.W., Suite 405, Washington, D.C. 20001, Date Published - January, 1981, Prepared for the United States Department of Energy, Under Contract No. EF-77-C-01-2468; FE-2468-88, Dist. Category LIC-90D.

These feeders permit decomposer 32 to be a continuously, or semicontinuously in the case of e.g. lock hopper-type systems, operating pressure vessel, where Al(OH)$_3$ entering chamber 36 falls into a number of tubes 38, of which only three have been shown for schematic purposes. Tubes 38 are at a high temperature, for instance 250° to 650° C., so that free moisture and chemically combined water are driven off as steam. This evolution of water in the gaseous state fluidizes the Al(OH)$_3$ particles in tubes 38. Residence time in the tubes is e.g. 10 to 120 minutes.

The high temperature in the tubes is achieved by hot gases entering chamber 39 through line 40 and leaving through line 42. Chamber 39 is enclosed by side walls 39a, top wall 39b and bottom wall 39c.

As the particles of Al(OH)$_3$ fall into tubes 38, they pile on top of one another to form a bed. The water evolved from them in the gaseous state flows upwardly toward the vent to line 44 and is sufficient to fluidize the particle beds in the tubes. This is termed self-fluidizing, in that the fluidizing gas comes from the particles themselves. During start-up, steam from an auxiliary steam source may be injected into chamber 52 through line 53 to fluidize particles in the tubes 38, until self-fluidization is achieved, after which line 53 may be closed.

To the extent that the evolved water may not be enough to achieve desired fluidization, such may be supplemented by steam injection through line 53 during water removal from the Al(OH)$_3$. Steam feedback from line 44 to line 53 is another possibility. Feedback can be used, for example, to maintain fluidization, or prevent bed particles from interbonding, when the process might be placed in idle, as when the need for steam in the Bayer plant is temporarily diminished.

The steam product of the invention moves through line 44 to a solids separator such as cyclone 46, with solids being returned to the decomposer through line 48 and steam going to the Bayer process through line 50 to lines 28 and 30. It is estimated that steam from the decomposer will make up one-third of the total steam needed by a Bayer process. The remaining two-thirds will enter line 50 through line 49 and will come from one or more water boilers (not shown). In general, the steam coming from the decomposer will be in a superheated condition, and this may be cared for by heat loss in the lines or by a heat recovery desuperheater (not shown) to bring the steam to its saturation temperature at its location of use. For example, condensate returning to water boilers feeding line 49 may be preheated by running through such a desuperheater. Such condensate may also be used to get more heat from the gases in line 42.

The aluminum-bearing product resulting from removal of water from the Al(OH)$_3$ in tubes 38 collects in the chamber 52. It now comprises particles of boehmite and/or gamma alumina and X-ray indifferent (no well-defined diffraction pattern) alumina pseudomorphous with aluminum hydroxide. Gamma alumina is somewhat on the borderline of being X-ray indifferent in that its diffraction pattern is not very well-defined. The product loss on ignition (LOI) (300° to 1200° C.) is in the range from 1 to 12%, its surface area in the range 10 to 100 m$^2$/g.

Interestingly, in the pressurized decomposer, there is less breakage of particles during water removal than is the case during the flash or kiln calciner, prior art techniques of water removal. In laboratory scale tests, there was no particle breakage as determined by "before" and "after" weights of the $-325$ mesh particle size fraction; in similar laboratory scale tests for atmospheric pressure, flash or kiln calciner tests, it is typical to find that the $-325$ mesh size fraction increases in weight by 2 to 5% due to particle breakage.

The aluminous product in chamber 52 is next conducted through pressure-reducing feeder 54 (of the same construction as feeder 34) and line 56 to the flash calcining operation of FIG. 1C for further water removal to produce an alumina suitable for electrolysis in the Hall-Heroult process for producing aluminum metal.

Alternatively, in the case where the higher temperature portion of the 250° to 650° C. range in the decomposer has been used, the product in line 56 may be collected as feed for a Hall-Heroult electrolysis. Thus, Example I below shows that sufficiently low LOI values can be achieved for this purpose.

The flash calciner may be built on the principles described in "Alumina Calcination in the Fluid-Flash Calciner" by William M. Fish, *Light Metals* 1974, Volume 3, The Metallurgical Society of the American Institute of Mining, Metallurgical and Petroleum Engineers, Inc., New York, N.Y., pages 673–682, and in "Experience with Operation of the Alcoa Fluid Flash Calciner" by Edward W. Lussky, *Light Metals* 1980, The Metallurgical Society of AIME, Warrendale, Pa., pages 69–79. Alternative equipment are (1) the F. L. Smidth calciner as described in a paper presented at the AIME annual meeting in Dallas in February, 1982, by B. E. Raahauge et al and (2) the Lurgi/VAW calciner as described in the Proceedings of the Second International Symposium of ICSOBA, Volume 3, pages 201–214 (1971).

The flash calciner schematically illustrated in FIG. 1C receives, e.g, boehmite particles through line 56 and brings them to temperatures in the range 950° to 1220° C. by the action of the fuel through line 58 and the hot gas (line 60) which supports the combustion of the fuel. Alumina product is collected through line 62. Hot exhaust gases leave through line 64 and are cleaned of entrained alumina in separator 66, with solids being directed through line 68 to line 62 and hot exhaust traveling through line 40 to heat the decomposer.

B. Batch Process

Figure 2:
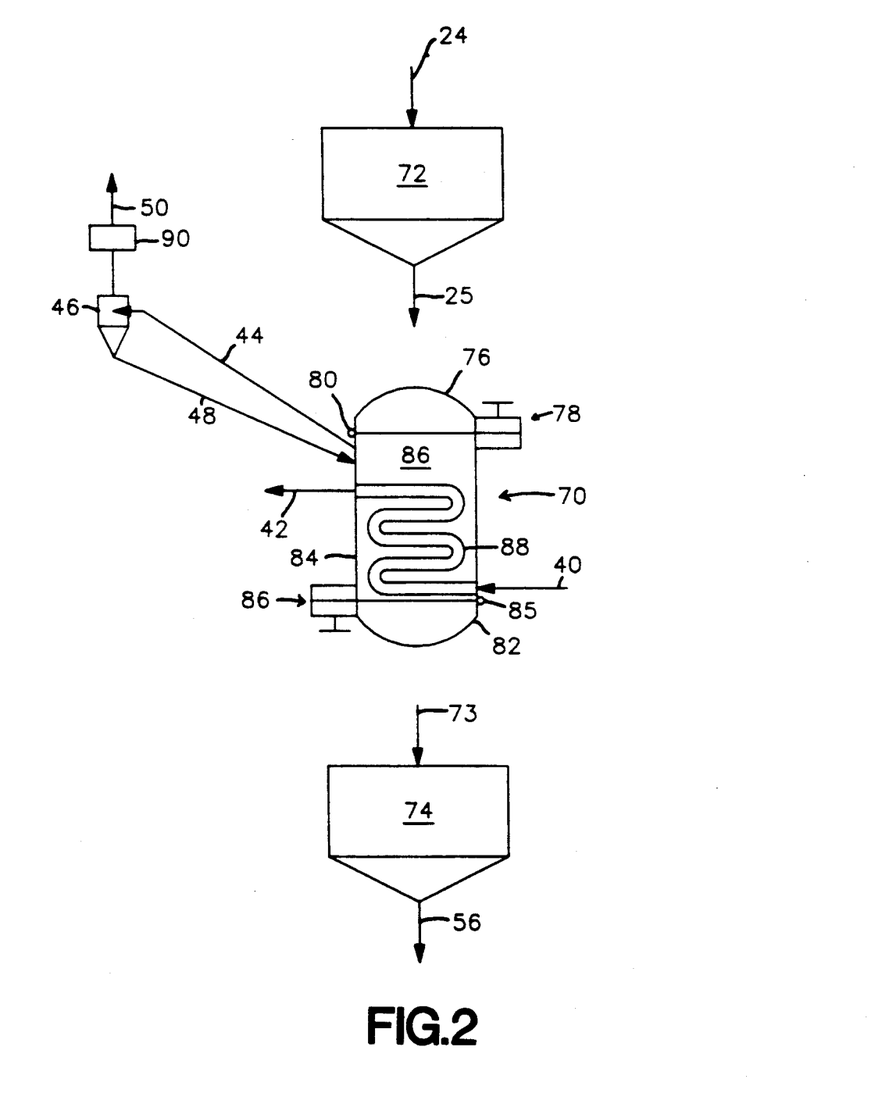
FIG. 2 is a schematic of an alternative apparatus for use in the process of FIG. 1.

The process of FIGS. 1A to 1C operates continuously. The portion in FIG. 1B may be operated in a batch mode as illustrated in FIG. 2. FIG. 1 numerals have been retained where the equipment is the same. This modification is achieved by substitution of a batch decomposer 70 and suitable storage hoppers 72 and 74 to accommodate the still continuous feeds through line 24 from the Bayer process and through line 56 to the flash calciner.

Batch decomposer 70 includes a lid 76, which may be moved between a pressure-sealing position (shown) and an open position (not shown) by releasing clamp 78 and rotating counterclockwise, say 95°, about hinge 80. On the lower end of the decomposer is a floor 82. Lid 76 and floor 82 form, together with side walls 84, a chamber 86. With floor 82 in the closed position, as shown, pressure-sealing of chamber 86 is complete. Floor 82 can be rotated counterclockwise about hinge 85, upon release of clamp 86, to open chamber 86 for emptying a batch of product.

Chamber 86 is heated by heat exchanger 88, which is located within chamber 86 and provided with a flow of hot gas through lines 40 and 42. Electric heating is another option.

Back pressure regulator or valve 90, firstly, acts to prevent steam in line 50 from flowing back into decomposer 70 when the pressure in the decomposer is still too low and, secondly, opens line 50 to steam only after the desired pressure, e.g. 110 psia, has been achieved in the decomposer.

In operation of the batch process, lid 76 is opened, and Al(OH)$_3$ from hopper 72 is loaded into chamber 86 through line 25. The resulting bed self-fluidizes from the action of heat exchanger 88 in driving free moisture and chemically combined water from the Al(OH)$_3$ particles.

As more and more water is driven off in the form of steam, the pressure within chamber 86 rises. Steam moves through line 44 to cyclone 46 as explained above for continuous operation. When the pressure on valve 90 builds up to a sufficient value, valve 90 opens and steam is supplied through line 50 to the Bayer process.

When sufficient water has been removed, floor 82 is opened and e.g. boehmite product released from chamber 86 in direction 73 into hopper 74.

Before valve 90 opens, the Bayer process can be supplied from any auxiliary steam source supplying steam of desired pressure. The auxiliary source can e.g. include a second decomposer 70 run in alternation with that illustrated in FIG. 2.

C. Products

The steam producing process of the invention as applied to Al(OH)$_3$ gives new products.

Operating conditions of the pressure decomposer are: temperature: 250°-650° C.; pressure (steam): 20-250 psig; and residence time: 10-120 minutes. The hydrate decomposes under these conditions releasing water as steam under pressure and producing a partially calcined alumina. Our investigations have shown that the dehydration of alumina hydrate under steam pressure progresses by initial conversion of the trihydrate (gibbsite) to the oxide-hydroxide boehmite. The boehmite formed then decomposes to gamma and/or X-ray indifferent, or amorphous, alumina partially or fully depending on the temperature and residence time of the material in the decomposer.

Thus, the material coming from the decomposer is boehmite and gamma and/or X-ray indifferent alumina pseudomorphous with aluminum hydroxide. The boehmite content is usually relatively high, in the 10 to 50% range. Each particle is composed of a plurality of crystals. Loss on ignition (LOI) (300°-1200° C.) is in the range 1 to 12%, the lower water content material being obtained using the high portion of the e.g. 250° to 650° C. temperature range in the decomposer. Surface area will be in the range 10-100 m$^2$/g (square meters per gram). Surface area data herein is BET, N$_2$ adsorption.

In the case where a high temperature, atmospheric pressure, i.e. at most 10 psig (resulting from blowers to move the gases), calcination follows the decomposer, the resulting alumina attains an LOI (300°-1200° C.) of less than 1%, a surface area in the range of 10-100 m$^2$/g, and a modified Forsythe-Hertwig attrition index of 1 to 20.

Attrition index data herein is determined according to the method of Forsythe and Hertwig, "Attrition Characteristics of Fluid Cracking Catalysts", Ind. and Engr. Chem. 41, 1200-1206, modified in that samples are attrited for only 15 minutes, this time having been found to be better for showing differences in aluminas.

Attrition Index I = 100(X − Y)/X where
X = percent plus 325 mesh before attrition,
Y = percent plus 325 mesh after attrition.

The lower the attrition index, the higher is the resistance to attrition.

In general, the alumina product of the invention is much stronger, e.g. has a lower attrition index, than alumina made by calcining Al(OH)$_3$ at atmospheric pressure.

There are benefits in combining an initial pressure decomposition with a terminal atmospheric-pressure calcination. For instance, the terminal atmospheric-pressure calcination can be run at 850° C., or less, to bring LOI (300°-1200° C.) to 1% or below. This is to be compared to the over 950° C. required previously.

An additional benefit is the ability to arrive at an alumina product of 1% LOI, or less, and of surface area in the range 10-100 m$^2$/g, without producing any alpha-alumina, a crystalline form of poor solubility in the molten salt bath of a Hall-Heroult cell. In general, the atmospheric-pressure calcination converts the boehmite of the intermediate product to gamma alumina. Thus, 50% boehmite content in the product of the pressure decomposer will mean about 50% gamma alumina content in the product obtained by submitting the product of the pressure decomposer to an atmospheric-pressure calcination.

In both cases, decomposer only or decomposer plus calciner, the product is characterized by at least a reduced amount, and even an absence, of the parallel fissures so characteristic of the alumina that results from aluminum hydroxide calcined at the zero, to perhaps at most the 7, or 10, psig pressures previously used in dewatering the feed for Hall-Heroult cells.

Figure 3:
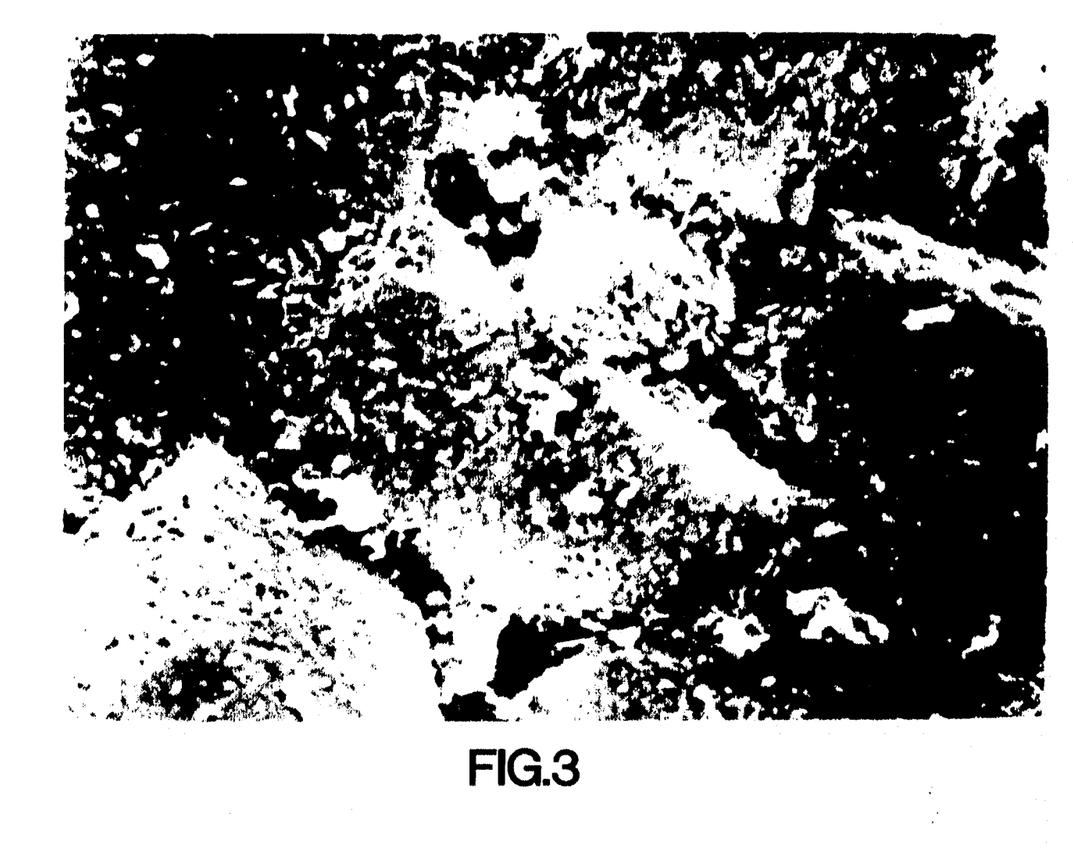
Figure 4:
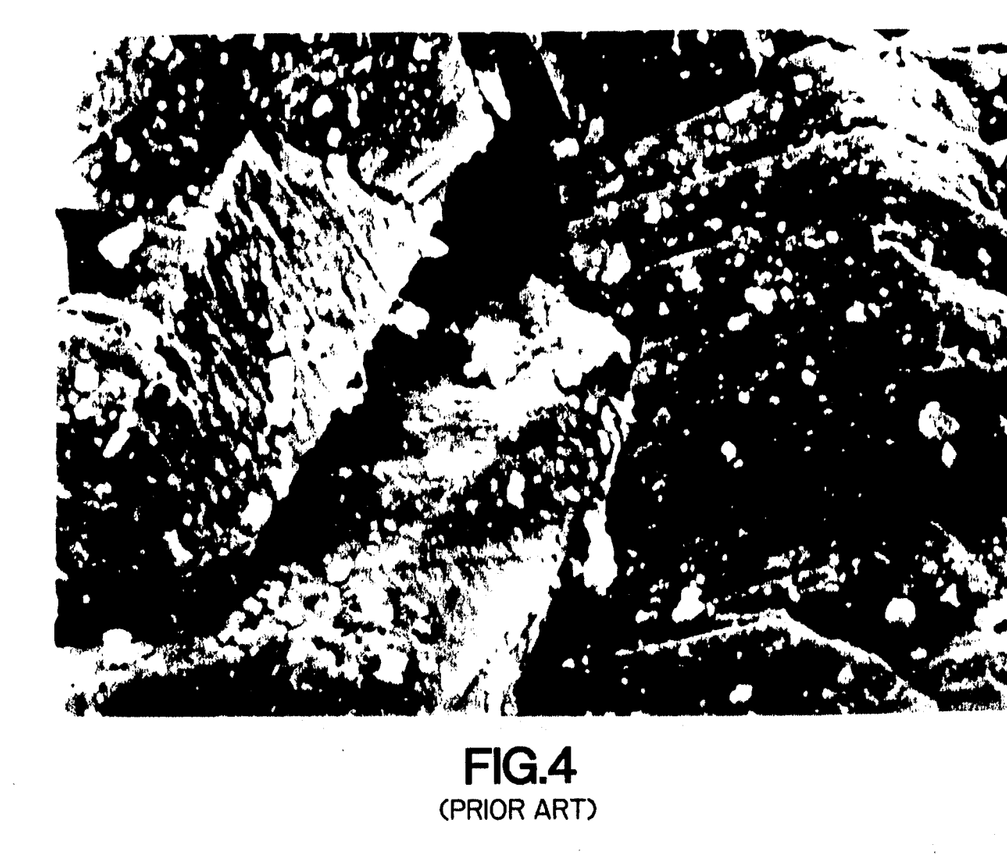

FIG. 3, compared with FIG. 4, illustrates this important characteristic of products according to the invention, namely the reduced amount, or even absence, of parallel fissuring.

The prior art product (Reference No. AP T182B) of FIG. 4 was prepared by calcining Al(OH)$_3$ in a flash calciner as described in the above-cited articles of Fish and Lussky. It measures 1 to 5% boehmite, rest amorphous. As is evident from FIG. 4, the prior art product is characterized by parallel fissuring. This prior art alumina product had an LOI (300°-1200° C.) of 0.94%, a surface area of 84 m$^2$/g, and an attrition index of 15.

The product (Reference No. AP 4052-H2) of FIG. 3, which is a product according to the invention, was prepared by heating Al(OH)$_3$ at 500° C., 120 psig pressure, for one hour under self-fluidizing conditions and then at 850° C., atmospheric pressure (0 psig), for one hour (the 850° C. treatment corresponding to a flash calcining operation). The product resulting from this treatment was about 50% gamma alumina, rest amorphous, and had an LOI of 0.5%, a surface area of 51 m²/g and an attrition index of 6. Clear from a comparison of FIG. 3 with FIG. 4 is, in this example, a complete absence of parallel fissuring in the product of the invention.

It is thought that a beneficial result of the lack of parallel fissuring is an ability of the product of the invention to be handled and transported with a lesser production of fines as compared with material having the parallel fissuring. In any event, the product of the invention is stronger, as evidenced by characteristically lower values of the modified Forsythe-Hertwig attrition index. Thus, for a given $Al(OH)_3$ feed, it is possible to achieve consistently lower attrition indices for the alumina feed for Hall-Heroult cells. For example, for a given $Al(OH)_3$ feed, the attrition index will be at least 2 units lower for the product of the present invention than it would be for a product of the same LOI achieved in an atmospheric pressure calcination. Furthermore, attrition indices lower than those of previous commercial alumina products are obtainable in the present invention. Thus, it is known that different $Al(OH)_3$ feeds give different attrition indices in atmospheric pressure calcination. Lower attrition indices are said to result from well crystallized $Al(OH)_3$ while higher indices come from weakly crystallized $Al(OH)_3$. Using well crystallized $Al(OH)_3$ in atmospheric pressure calciners, the lowest attrition indices previously obtained were 4 or 5. In the present invention, well crystallized $Al(OH)_3$ yields attrition indices of 2 or less.

Further illustrative of the invention are the following examples:

EXAMPLE I

A product (Reference No. AP 4203-6) was decomposed according to the present invention by transferring heat through the walls of a container and into a bed of $Al(OH)_3$ in the container. The temperature in the bed was 600° C. Heating was for a period of one hour. Pressure was 120 psig. The bed self-fluidized under the action of the gaseous water, steam, coming off the particles. There was no particle breakage during this process, i.e. no increase in the weight of the −325 mesh size fraction. The product obtained by this procedure had an LOI (300°–1200° C.) of 1.5%, a surface area of 94 m²/g and an attrition index of 4. X-ray diffraction analysis gives the following results: about 2% boehmite (X-ray diffraction pattern matching those of cards 5-0190 and 21-1307 of the Joint Committee on Powder Diffraction Standards, Swarthmore, Pa.), rest gamma and amorphous.

EXAMPLE II

A product (Reference No. AP 4064) was prepared according to the present invention by transferring heat through container walls and into a bed of $Al(OH)_3$ in the decomposer container. Bed conditions were 500° C., 120 psig pressure, one hour residence time. The material in the bed self-fluidized under the action of the gaseous water being evolved during decomposition. A product containing 28% boehmite resulted. Subsequently, the product of this high pressure treatment was heated at 850° C., atmospheric pressure (0 psig), for one hour (this 850° C. treatment corresponding to a flash calcining operation). The final product had an LOI (300°–1200° C.) of 0.5%, a surface area of 60 m²/g and an attrition index of 2. X-ray diffraction analysis gave the following results: 0% boehmite, rest gamma and amorphous.

EXAMPLE III

Products of the invention were prepared as in Example II, except for the following differences. Decomposer bed temperature was 400° C. Analysis of the product from the decomposer: surface area 40 m²/g, LOI 13.4%, attrition index 5, %-boehmite 44%. Analysis of the product from the 850° C., atmospheric-pressure calcining: LOI 0.5%, %-boehmite 0%, surface area 41 m²/g.

EXAMPLE IV

Products of the invention were prepared as in Example II, except for the following differences. Decomposer bed temperature was 400° C., pressure 200 psig, time at pressure ¾ hour. Analysis of the product from the decomposer: surface area 19 m²/g, LOI 16%, attrition index 9, %-boehmite 44%. Analysis of the product from the 850° C., atmospheric-pressure calcining: LOI 0.4%, %-boehmite 0%, surface area 30 m²/g, attrition index 9.

EXAMPLE V

Products of the invention were prepared as in Example II, except for the following differences. Decomposer bed temperature was 400° C., pressure 60 psig, time at pressure 2 hours. Analysis of the product from the decomposer: surface area 63 m²/g, LOI 11.3%, %-boehmite 30%. The atmospheric-pressure calcining was at 750° C., again for 1 hour. Analysis of the product from this calcining was: LOI 0.9%, surface area 65 m²/g and attrition index 6.

What is claimed is:

1. In a process utilizing steam, the method of producing and supplying at least a portion of said steam, comprising the steps of
   (a) heating a solid $Al(OH)_3$ at a temperature greater than 250° C. in a decomposer at a pressure greater than one atmosphere gage pressure
      i. for decomposing said $Al(OH)_3$ to drive off chemically combined water, and
      ii. for yielding said water in the form of steam which is essentially 100% $H_2O$ at a pressure greater than one atmosphere gage pressure,
   (b) removing said steam from the decomposer while keeping said steam at a pressure greater than one atmosphere gage pressure,
   (c) capturing said steam, still at a pressure greater than one atmosphere gage pressure, for said process, said process being external to said decomposer, and
   (d) feeding said steam, still at a pressure greater than one atmosphere gage pressure, to said process.

2. A method as claimed in claim 1, wherein temperature, pressure, and time in the step of heating are insufficient to convert said $Al(OH)_3$ to alpha alumina.

3. A method as claimed in claim 1, wherein the aluminum hydroxide comprises a bed in the step of heating, said bed being fluidized.

4. A method as claimed in claim 3, wherein said water self-fluidizes the bed.

5. A method as claimed in claim 1, the step of heating being carried out in the range up to 650° C.

6. A method as claimed in claim 5, the step of heating being carried out in the range 350°-650° C.

7. A method as claimed in claim 6, the step of heating being carried out in the range 400°-650° C.

8. A method as claimed in claim 1, wherein the process utilizing steam comprises treating a slurry of bauxite ore with sodium hydroxide solution to dissolve aluminum values while maintaining temperature and pressure conditions of the slurry with steam.

9. A method as claimed in claim 1, wherein the step of heating comprises indirect heating with combustion gases.

10. A method as claimed in claim 8, wherein the solid substance comprises $Al(OH)_3$, the step of heating comprises indirect heating, and the temperature, pressure and time in the step of heating are insufficient to convert the $Al(OH)_3$ to alpha alumina.

* * * * *

UNITED STATES PATENT AND TRADEMARK OFFICE
CERTIFICATE OF CORRECTION

PATENT NO. : 5,141,734
DATED : August 25, 1992
INVENTOR(S) : Chanakya Misra and Steven W. Sucech It is certified that error appears in the above-indentified patent and that said Letters Patent is hereby corrected as shown below:

On the Title Page, Item [56], Other Publications, change "Abstrand" to --Norstrand--.

Signed and Sealed this

Twelfth Day of July, 1994

Attest:

BRUCE LEHMAN

Attesting Officer     Commissioner of Patents and Trademarks